United States Patent [19]

Rau et al.

[11] 4,315,547

[45] Feb. 16, 1982

[54] AGRICULTURAL ATTACHMENT

[75] Inventors: Willy Rau, Weilheim; Christian Taus, Kirchheim, both of Fed. Rep. of Germany

[73] Assignee: Maschinenfabrik Rau GmbH, Weilheim, Fed. Rep. of Germany

[21] Appl. No.: 32,905

[22] Filed: Apr. 24, 1979

[30] Foreign Application Priority Data

Apr. 26, 1978 [DE] Fed. Rep. of Germany ....... 2818274
Sep. 27, 1978 [DE] Fed. Rep. of Germany ....... 2842037

[51] Int. Cl.³ ..................... A01B 49/02; A01B 21/04; A01B 79/00
[52] U.S. Cl. ........................................ 172/1; 172/134; 172/142; 172/146; 172/149; 172/177; 172/520; 172/640; 172/199; 172/240
[58] Field of Search ............... 172/134, 149, 583, 151, 172/240, 145, 580, 328, 327, 146, 680, 140, 413, 579, 640, 520, 326, 40, 147, 1, 123, 395, 619, 407, 142, 133, 148, 174, 175, 177, 195, 197, 199, 324, 520, 547, 613

[56] References Cited

U.S. PATENT DOCUMENTS

| 466,771 | 1/1892 | Clark | 172/520 |
|---|---|---|---|
| 1,577,677 | 3/1926 | Beatty | 172/134 X |
| 1,947,127 | 2/1934 | Dunham | 172/146 X |
| 2,760,323 | 8/1956 | Cooper | 172/583X |
| 3,209,841 | 10/1965 | Lely et al. | 172/140 X |
| 3,213,946 | 10/1965 | Carrick | 172/583 X |
| 3,590,928 | 7/1971 | Mirus | 172/240 |
| 3,777,823 | 12/1973 | Holfeld | 172/328 |
| 4,130,167 | 12/1978 | Lely | 172/40 |
| 4,180,005 | 12/1979 | Zombahlen | 172/146 X |

FOREIGN PATENT DOCUMENTS 728199 10/1942 Fed. Rep. of Germany ...... 172/149
20320 of 1902 United Kingdom ................ 172/520

OTHER PUBLICATIONS

John Deere Model "B" Roller Harrow Operators Manual OM-B60-258, 4-1958.

*Primary Examiner*—Paul E. Shapiro
*Attorney, Agent, or Firm*—Michael J. Striker

[57] ABSTRACT

An attachment for agricultural machines includes a frame having a leading and trailing portion, a first soil-treating unit located at the leading portion of the frame and a second soil-treating unit located at the trailing portion of the frame. Between the first unit and the second unit there is located on the frame wheels for supporting the frame when an agricultural machine provided with the attachment moves along a road. The wheels are displaceable relative to the frame between a first position in which the wheels engage the ground and a second position in which the wheels do not engage the ground. The frame is so coupled to a lifting device of the agricultural machine that, when the wheels are in the second position, the trailing portion of the frame is supported on the ground by the second soil-treating unit.

45 Claims, 12 Drawing Figures

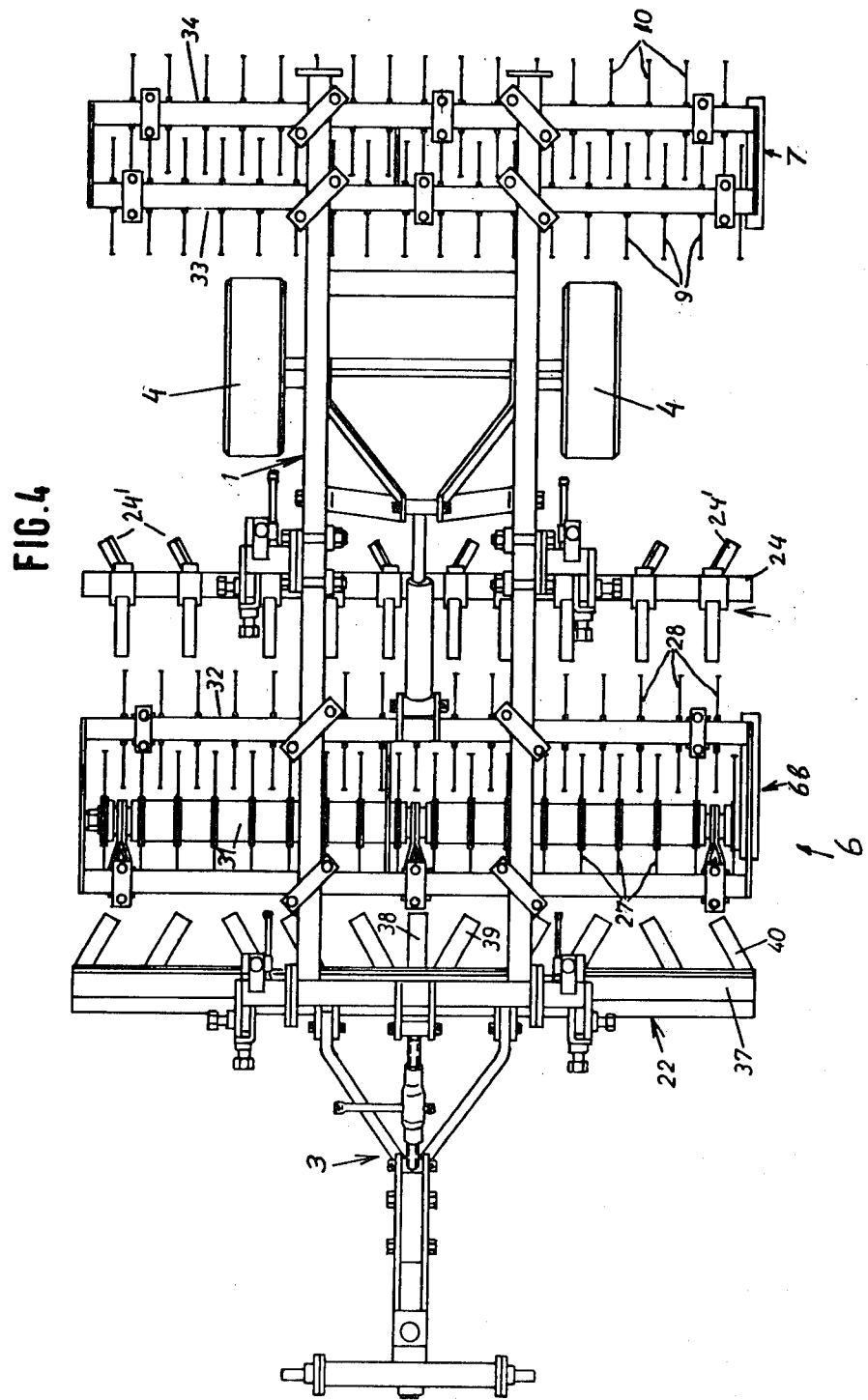

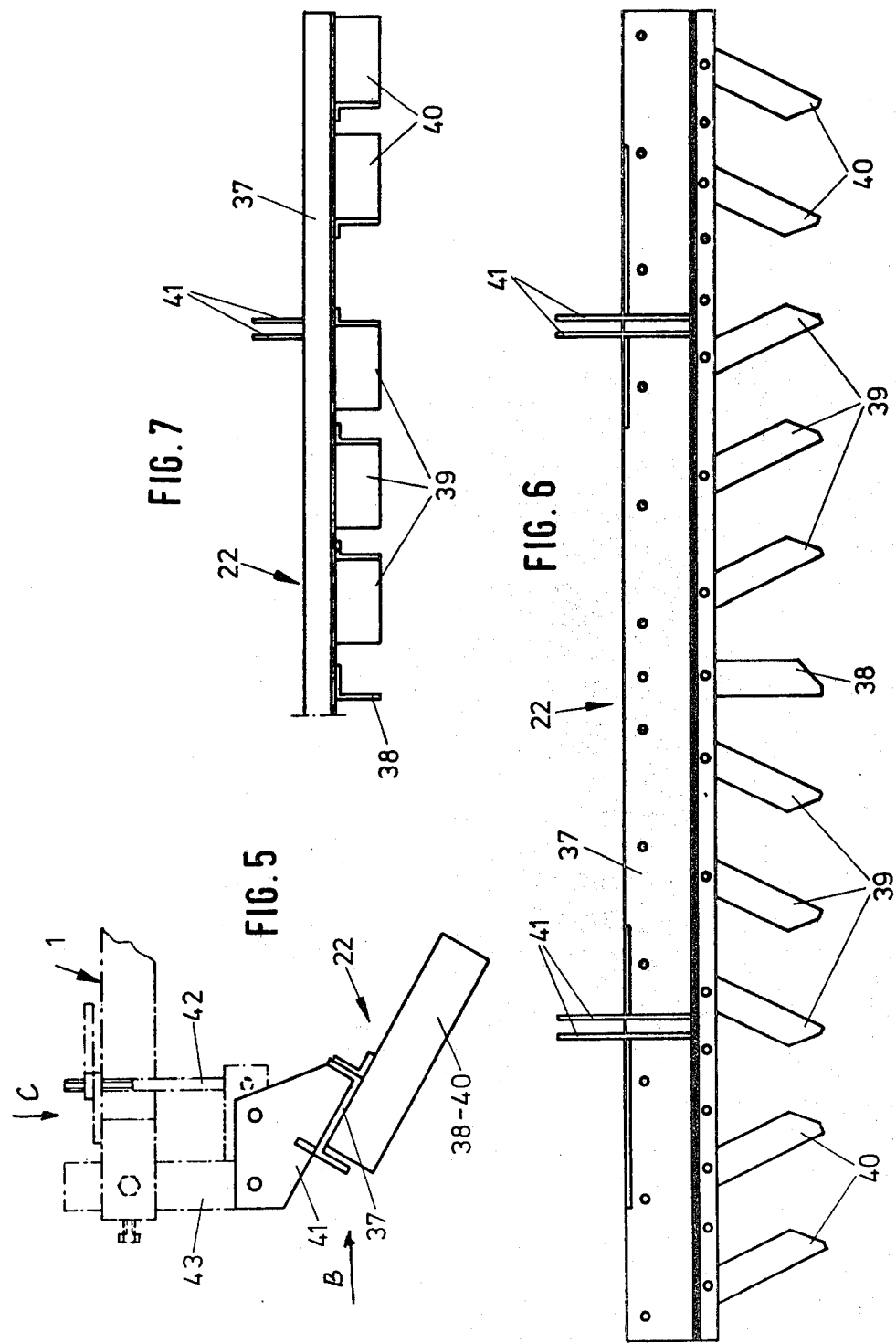

AGRICULTURAL ATTACHMENT

BACKGROUND OF THE INVENTION

The present invention relates to attachments for and methods of cultivating soil by agricultural machines.

It is known to provide an agricultural machine (e.g. a tractor) with an attachment which includes a frame having a coupling device for connecting the frame to the tractor. The attachment may include at least two different soil-treating arrangements mounted on the frame one after the other. The attachment further may include wheels located on the frame, for example, between the soil-treating arrangements. The wheels may be adjustable vertically relative to the frame.

A first (i.e. the one closest to the tractor) soil-treating arrangement may constitute a set of tires, whereas a second soil-treating arrangement, which follows the first arrangement, may constitute a set of rollers and disk harrows. The wheels serve on the one hand to support the frame when a tractor, which is provided with the attachment, moves on a road. On the other hand, the wheels are used to support the frame on the ground whenever it is necessary to lift the leading end of the frame, for example in order to adjust the position (e.g. extension) of the working elements (i.e. tires) of the first soil-treating arrangement, to thereby, for example, vary the depth of cutting of the working elements into the soil.

Thus, when the tractor with the attachment reaches the end of the field to be cultivated and has now to make a turn in order to cultivate the next row, the wheels are used in order to support the entire frame in such a position relative to the soil to be treated, that the first and the second soil-treating arrangements do not engage the ground. However, the wheels leave traces on the soil, which have to be eliminated later. Moreover, the wheels may mire (i.e. sink) in the soil so that any manipulations with the attachment become considerably more complicated if possible at all. Needless to say, that the additional steps of eliminating the wheel traces on the soil considerably increase overall soil-treating expenses. It is also disadvantageous that each time the tractor makes a turn an operator has to actuate an operating lever in order to bring the wheels into engagement with the ground. The attachment is usually connected to the tractor by a three-point suspension system.

It has also been recognized that the known agricultural attachments are not satisfactory with respect to the requirements made to quality of the soil cultivated by these attachments. Shaking or crushing (breaking) elements in combination with rollers (e.g. crumbling rollers) treat the soil only on the upper surface thereof. These arrangements cannot cultivate the soil on a sufficient (i.e. adequate) depth thereof. The same is true when instead of the shaking or crushing elements one uses ground mills.

Another shortcoming resides in the fact that, since the arrangements are positively actuated, the tractor (provided with such an arrachment) has to move with a relatively small speed, otherwise the soil will be cultivated badly or different parts of the attachment may be excessively overloaded.

The attachment includes a great number of separate movable parts which are expensive on the one hand and constitute a danger of abrasion (i.e. wear) and incidents, on the other hand. On the whole, the known agricultural attachments are not economical at all.

The disk harrows are inclined relative to a direction of movement of the tractor during the cultivation. However, such harrows may comminute (i.e. mash) relatively large particles of the soil only to a certain extent (i.e. only to a certain size). Moreover, these harrows do not have the adequate cultivating effectiveness even at a relatively small depth of the soil to be cultivated. Therefore, in order to adequately cultivate the soil all the way over an adequate predetermined depth, these harrows have to be pulled a few times along one and the same field all over again.

A conventional agricultural attachment including one set of tines and rollers and another following set of tines and rollers may be more or less effectively used when the field to be cultivated has a comparatively even (i.e. non-rough) upper surface. However, should the upper surface of a field be comparatively rough (i.e. non-even), then the conventional agricultural attachment becomes even less productive since the latter cannot cultivate such a rough soil uniformly over a predetermined depth. This occurs since the rollers are effective only on the upper surface and cannot penetrate deeper in the soil to the adequate depth. As a result, a lower portion of the soil, i.e. below roots of plants in the soil cultivated by such an attachment, stiffens (i.e. hardens) which leads to developing of an excessive ground humidity in the upper portion of the soil. Obviously, any excessive ground humidity is undesirable, since it negatively affects the plants and may ruin the latter.

SUMMARY OF THE INVENTION

It is a general object of the present invention to avoid the disadvantages of the prior art agricultural attachments for and methods of cultivating the soil by agricultural machines.

More particularly, it is an object of the present invention to provide an agricultural attachment which can be used in a simple and reliable manner without leaving any undesirable traces on the upper surface of the soil to be cultivated.

Another object of the present invention is to provide such an agricultural attachment which renders it possible to considerably increase the power-area ratio as opposed to that of the known attachments for the same purpose.

Still another object of the present invention is to provide a method of cultivating soil having a rough upper surface uniformly over a predetermined depth.

In pursuance of these objects and others which will become apparent hereafter, one feature of the present invention resides in an attachment for agricultural machines, which attachment comprises a frame which has a leading portion and a trailing portion, first soil-treating means mounted at the leading portion of said frame and a second soil-treating means mounted at said trailing portion of the frame. The attachment is further provided with wheel means mounted on said frame for supporting the latter when an agricultural machine provided with the attachment moves on a road. The wheel means are displaceable between a first position in which they engage the ground and a second position in which they do not engage the ground. In the first position, the wheel means support the frame with said first and second soil-treating means being upwardly spaced from the ground. There are further provided means for coupling said frame at the leading portion thereof to a lifting device so that, when said wheel means are in said second position, said trailing portion of the frame is supported on the ground by said second soil-treating means.

Thus, according to the present invention, it becomes possible to use the wheel means only for supporting the frame when the agricultural machine moves on a road. This feature makes the whole process of manipulating and handling the attachment effectively simple and yet reliable. When the agricultural machine makes a turn at the end of the field, for example, it becomes unnecessary to move the wheel means back into the first position, that is in the engagement with the ground, i.e. the step which is a troublesome routine in the case of conventional attachments. An operator of the attachment of the present invention has only to actuate a conventional lifting handle when the agricultural machine is ready to make a turn. Thus, any trace development, which may be caused by the wheels when the latter are in the engagement with the soil (i.e. the serious problem in the case of the prior-art attachments) is excluded. This fact saves a considerable waste of time which was necessary in the case of the prior-art attachment to eliminate the wheel traces from the soil. Moreover, the arrangement according to the present invention positively excludes any danger that the wheels may get mired in the soil with all unavoidable negative consequences.

In another feature of the present invention, the first soil-treating means include at leaast one grubber, whereas the second soil-treating means include at least one set of cutting disks or rollers. In a preferred embodiment, the second soil-treating means include at least one set of star rollers.

In still another feature of the present invention the cutting elements (e.g. disks, rollers, star rollers, etc.) are mounted on a common shaft. There might be provided two (or more) such shafts. The cutting elements on each shaft are spaced one from another so as to define a space between two adjacent cutting elements. The shafts may be so arranged relative to each other (if there are two of them) that each cutting element of one shaft extends partially into the space between two respective adjacent cutting elements of the other shaft.

Such an arrangement of the cutting elements of two shafts relative to one another quarantees a constant automatic cleaning of the cutting elements during the cultivation process. This factor renders it possible to conduct the cultivation with a relatively high speed even if a field to be cultivated contains stubbles of high straws, left on the field after harvesting.

In yet another feature of the invention, the wheel means are arranged on the frame between said first and second soil-treating means. The space between the first and second soil-treating means is so dimensioned as on the one hand to ensure a compact overall size of the attachment (which factor is rather important for stability of the attachment) and on the other hand to render it possible for the soil, cultivated by the first soil-treating means (i.e. by the grubber) to become settled before it engages with the second soil-treating means (e.g. star rollers). Such an arrangement renders it possible to increase the effectiveness of the second soil-treating means (e.g. star rollers). On the other hand, any choking (i.e. clogging) development on the second soil-treating means is prevented.

The use of the star rollers as the second soil-treating means makes the process of turning the agricultural machine very effective, since the star rollers assure a relatively certain depth of sinking into the soil. Thus, the star rollers effectively support the trailing portion of the frame when the leading portion is lifted, even under adverse circumstances.

In a further feature of the present invention, the first soil-treating means further include a support for carrying a grubber device. The support is mounted on the frame. Such an arrangement renders it possible to obtain certain manufacturing advantages. Thus, for example, the first soil-treating means may be assembled as a separate unit on the frame. However, the separate unit of the first soil-treating means may be directly connected to or coupled (via coupling means, such as a three-point suspension structure) with the agricultural machine (tractor). Moreover, the separate support of the first soil-treating means, permits any desired location thereof relative to the frame and to the tractor so that it becomes possible to utilize the first soil-treating means with a maximum efficiency. Thus, for example, each cutting element of the first soil-treating means may be separately adjusted relative to each other and to the soil to be cultivated so as to obtain the best possible effectiveness of each cutting element in particular and the first soil-treating means in general.

In the case of the grubber, the support may have one end pivotable relative to the frame and another end provided with an adjustable arresting device. Such an arrangement renders it possible to regulate (i.e. adjust) the position of the support (and the grubber) relative to the soil to be cultivated and to the frame independently of the means for coupling the frame to the tractor and the sinking depth of the star rollers constituting the second soil-treating means. On the other hand, the pivotal connection of the support to the frame ensures a reliable and simple lifting of the grubber with the frame when it is necessary to lift the leading portion thereof.

In a still further feature of the present invention, a method of cultivating soil having a rough upper surface (including a plurality of crests and troughs of furrows) by an agricultural machine, comprises the steps of leveling the upper surface of the soil so as to substantially reduce the roughness of the upper surface thereof; cutting the soil to obtains a stratum of a predetermined depth, having particles of substantially different sizes and comminuting the thusly obtained particles until the latter have substantially the same size over the entire depth of the stratum.

In a yet further feature of the invention the particles of differet sizes are comminuted in a few steps. Thus, at first the particles which are located on and comparatively close to the upper surface of the soil are subjected to comminuting and compacting. Thereafter, the stratum is turned over (i.e. upside down), that is the particles located at the bottom of the stratum, i.e. those which were not originally comminuted, are brought to or closer to the upper surface and the previously comminuted particles are brought all the way down to the bottom of the stratum, that is away from the upper surface of the soil. Thereafter, the particles located on or close to the upper surface of the soil are subject to comminuting and compacting. As a result, all the particles of a given stratum have substantially the same size over the entire depth of the stratum.

In a preferred embodiment of the present invention the upper surface of the soil is leveled, i.e. the crests and troughs of the furrows are substantially eliminated, before the latter is subjected to cutting and comminuting.

Means for leveling the upper surface of the soil are mounted on the frame before the first and second soil-treating means. Such an arrangement excludes any possibility that the cutting elements of the first soil-treating means will cultivate only crests of the furrows on the upper surface of the soil to be cultivated without cultivating the soil over a predetermined depth, which was very likely to occur with the attachments of the prior art. Moreover, the attachment for and the method of cultivating the soil according to the present invention ensures that the soil is cultivated uniformly over an entire predetermined depth and width.

The method of cultivating the soil according to the present invention is especially economical and effective since all the soil-treating steps (which follow one another) are conducted by one and the same attachment for an agricultural machine.

In another embodiment of the present invention the attachment includes means for leveling the upper surface of the soil, followed by a separate unit of cutting disks or star rollers (also for crumbling purposes) and a separate set of elastically yieldable tines and eventually another separate unit of cutting disks or star rollers (also for crumbling purposes). Inasmuch as the leveling means substantially eliminate the crests and troughs on the upper surface (i.e. level the same) the following cutting elements (disks or star rollers) of the first soil-treating means cut the soil obtaining a stratum of a uniform predetermined depth and having particles of substantially different sizes. The particles on or close to the upper surface of the soil are comminuted so that the sizes of these particles are reduced. The following set of tines brings the particles of the stratum, located substantially at and close to the bottom of the stratum, all the way up on or close to the upper surface of the soil. The same tines make the already comminuted particles move downwardly towards the bottom of the stratum. The stratum itself becomes more compacted due to the action of the tines thereon. The cutting disks or star rollers of the second soil-treating means comminute only the particles which are located on and close to the upper surface of the soil so that all the particles of the same stratum have substantially the same size over the entire depth of the stratum. Finally, the particles in the stratum become adequately compacted and comminuted over the entire depth of the stratum.

The method of cultivating soil in accordance with the present invention is especially advantageous if the soil under question has been previously plowed and since then dried up. The attachment ensures that such a soil is uniformly compacted and comminuted over the entire predetermined depth. The depth of the stratum is usually selected depending on the kind of the seed to be planted. The chosen depth has to be sufficient to keep an adequately sufficient amount of moisture in the upper portion of the stratum, which portion is better aerated.

In a preferred embodiment of the present invention, the cutting elements (disks or star rollers) are arranged in two (or more) sets located one after another. Each set has a common shaft for supporting the respective cutting disks or star rollers of one set. The sets may be operatively connected to each other so that rotation of one of these sets causes rotation of another of these sets. The sets are rotated as long as the attachment moves along the soil engaged with the cutting elements (e.g. disks or star rollers). In other words, there is no need to provide a special driving element for rotating the shafts with the cutting elements on them. If compared with the prior-art attachments where the sets of cutting disks and rollers are separated from each other, the arrangement of the present invention ensures a uniform moment of rotation on all sets and all cutting elements in these sets thereof. Thus, if some cutting disks or rollers become locked for one reason or another, the respective remained disks or rollers will rotate the shafts and the locked disks or rollers as long as the attachment moves along the soil to be cultivated. Such a driving connection between two or more sets of the cutting elements may be very easily and reliably accomplished in a conventional manner, for example, by a chain drive.

If compared with the prior-art attachments in which the cutting sets are operatively connected to the outer driving shaft of a tractor motor, the corresponding cutting sets of the present invention render it possible to conduct the cultivation process at a relatively higher speed with the cutting sets covering relatively bigger transverse space of the soil at a time (e.g. a span over 3 m). Thus, the efficiency of the attachment according to the present invention is considerably increased as opposed to that of the prior-art attachments.

The leveling means may include a guide rail extending over the entire width of the attachment and a plurality of leveling elements located on the guide rail and forming thereon a leveling comb (i.e. rack). The leveling elements may be adjustable on the guide rail. Thus, the leveling elements may be inclined (i.e. sloped) relative to the guide rail.

The wheels may be installed on the frame not only between the first and second rail-treating means, but between the separate units of the first soil-treating means. The only requirement to the wheels and the chosen locations of the wheels is that the latter have to provide an adequately stable support for the frame, no matter how long the latter is.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 4 is a top view of the attachment shown in FIG. 8;

FIG. 5 is an enlarged side view of a leveling arrangement shown in FIG. 8;

FIG. 6 is a view of the leveling arrangement as seen in direction of an arrow C in FIG. 5;

FIG. 7 is a view of the leveling arrangement as seen in direction of an arrow B in FIG. 5;

DESCRIPTION OF THE PREFERRED EMBODIMENTS

Figure 1:
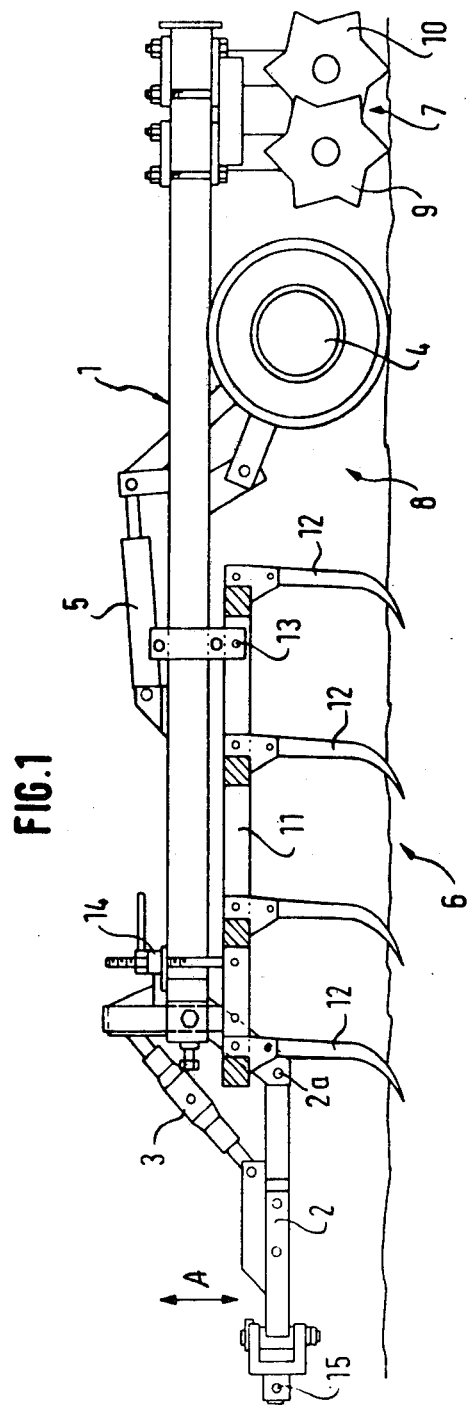
FIG. 1 is a side view of an attachment in accordance with the present invention.

Referring now to the drawing and first to FIG. 1 thereof, it may be seen that the reference numeral 1 designates a frame of an attachment including longitudinal and transversal beams. The frame 1 is connected through a center pole 2, e.g. a three-point suspension pole, to a tractor (not shown).

The center pole 2 is pivotably connected via a connecting rod 2a to the frame 1. The vertical displacement of the center pole 2 relative to the frame 1 is carried out by means of an adjusting device 3, e.g. a hydraulic cylinder-piston unit which has one end mounted on the upper surface of a leading portion of the frame 1 and another end connected to the center pole 2.

The frame 1 is provided with a pair of wheels 4, and an arrangement 5 (e.g. a hydraulic or pneumatic cylinder-piston unit) for displacing (e.g. pivoting) the pair of wheels 4 between a first position in which the wheels 4 engage the upper surface of the ground and a second position in which the wheels do not engage the upper surface of the ground. It is to be understood that when the wheels 4 are in the first position the frame 1 and all soil-treating units (which will be discussed in detail later on) are upwardly spaced from the ground. However, when the wheels 4 are in the second position, the soil-treating units become engaged with the ground.

The wheels 4 are designed for supporting the frame 1 and the soil-treating units mounted thereon when the tractor moves on a road.

FIG. 1 shows an intermediate position of the wheels 4. In the second position of the wheels 4, the latter may be located at least partially above the upper surface of the frame 1.

The frame 1 is further provided at least with two soil-treating arrangements located along the elongation of the frame 1 one after another. A first soil-treating arrangement 6 is located at the leading portion of the frame 1 whereas a second soil-treating arrangement 7 is located at the trailing portion of the frame 1.

The wheels 4 may be located on the frame 1 between the first and second soil-treating arrangements 6 and 7, respectively. However, it is possible to install the wheels 4 in front of the first soil-treating arrangement 6.

In accordance with a preferred embodiment of the present invention the wheels 4 are located on the frame 4 between the first and second soil-treating arrangements. Such a location insures an adequately stable support of the frame 1 even if the latter or the soil-treating arrangements mounted thereon have considerable dimensions.

The first soil-treating arrangement 6 is spaced along the elongation of the frame 1 from the second soil-treating arrangement 7 by a space 8. The space 8 is so dimensioned as on the one hand to accommodate freely the wheels 4 therein and on the other hand to permit a soil portion treated by the first soil-treating arrangement 6 to become settled before the second soil-treating arrangement 7 engages the same soil portions as the attachment (i.e. tractor) advances along the soil to be treated.

The first soil-treating arrangement 6 may constitute a grubber unit, whereas the second soil-treating arrangement 7 may constitute a star roller unit.

In accordance with a preferred embodiment of the present invention the star roller unit includes two sets of rollers 9 and 10. Each set includes a common shaft supporting the respective rollers 9 and 10. The rollers of the respective sets thereof are spaced one from another along the elongation of the respective shafts. The shafts of the respective sets of the rollers 9 and 10 are so arranged relative to each other that each roller of one set extends partially between two adjacent respective rollers of the other set thereof.

The shafts with the respective rollers 9 and 10 are rotatable about respective horizontal axes which are parallel to each other. When the wheels 4 are in the second position, i.e. they are not engaged with the ground, the lowest part of the wheels 4 is located at least above the axes of rotation of the rollers 9 and 10.

The grubber unit 6 and the roller unit 7 have a width substantially exceeding that of the frame 1. Such an arrangement renders it possible to pivot the wheels 4 upwardly relative to the frame 1 and between the units 6 and 7 in a simple and reliable manner.

The frame 1 may be further provided at the leading portion thereof with additional supporting wheels (not shown) which define the maximum extension of the grubber unit 6 from the lower surface of the frame 1 towards the ground. The roller unit 7 may be mounted on a separate support fixedly connected to the frame 1.

The grubber unit 6 is mounted on a separate support 11 which is connected to the frame 1. The support 11 is provided with a plurality of grubber tools 12. The tools 12 may be rigidly connected to the support 11. However, in accordance with another embodiment of the present invention the tools 12 may be provided with respective biasing means (not shown) normally urging the tools, for example in a direction towards the leading end of the frame 1. The tools 12 are respectively spaced transversely to one another and in the direction of movement of the tractor.

The support 11 may be adjusted relative to the frame 1. For this purpose, the rear end portion of the support 11 is provided with a pivoting supporting element 13. The front end portion of the support 11 is provided with an adjustable arresting member 14 adapted to fix the support 11 to a respective position thereof on the frame 1. Thus, the support 11 may be angularly adjusted relative to the substantially horizontal frame 1. Such an arrangement of the support 11 on the frame 1 renders it possible to obtain the best possible effectiveness of all the tools 12 depending upon the connection of the frame to the tractor and on extension of the tools 12 relative to the frame 1. Moreover, the support 11 may be so inclined relative to the frame 1 that the tools 12 uniformly engage the soil to be treated.

The center pole 2 is provided with a coupling element 15 for coupling the frame 1 to a lower connecting lever of the tractor. Based upon a relative position of the coupling element 15, the grubber unit 6 and the roller unit 7 it becomes possible to vary the angular position of the support 11 relative to the frame 1. In order to do this, the leading portion of the frame 1 is lifted in direction of an arrow A. When the wheels 4 are pivoted in the second position, i.e. above the upper surface of the frame and the leading portion of the frame 1 is lifted, the trailing portion thereof is supported on the ground by the roller unit 7. The leading portion of the frame 1 has to be also lifted when the tractor makes a turn on a field. Thus, whenever the leading portion of the frame has to be lifted, the wheels 4 do not have to be pivoted back into the first position, i.e. into the engagement with the ground, so as to support the trailing portion on the ground. Instead, the wheels 4 remain in the second position thereof and the trailing portion of the frame is supported on the ground by the roller unit 7.

The process of lifting and lowering the leading portion of the frame 1 is accomplished by a lifting device (not shown) located immediately above the three-point suspension of the tractor. Such a device may be operated in a simple and reliable manner by an operator from the tractor.

Since the wheels 4 do not engage the soil to be treated when the tractor makes a turn any trace development caused by the wheels on the soil is excluded. On the other hand any chance that the wheels 4 may become mired in the soil, if they are engaged with the soil, is also excluded. The rollers 9 and 10 have a comparatively larger supporting surface engageable with the soil. Therefore, any substantial sinking of the rollers 9 and 10 in the soil, when the leading portion of the frame 1 is lifted, is prevented. Moreover, the additional load on the rollers 9 and 10 when the leading portion of the frame 1 is lifted advantageously improves the treating results of the attachment at the areas of the field where the tractor makes a turn.

Thus, the function of the wheels 4 is exclusively limited to supporting the frame 1 when the tractor provided with the attachment moves along the road. Due to this feature, it becomes possible to save a considerable amount of time which is necessary to operate the wheels whenever the leading portion of the frame 1 has to be lifted. Moreover, it becomes possible to save time and energy which are necessary in order to eliminate the trace development on the soil should the wheels become engaged therewith. Since the function of the attachment is independent from the wheels 4, it becomes possible to increase the stability and weight of the attachment so that the soil-treating process may be conducted with an increased speed. The increased speed of the soil-treating process may be conducted with an increased speed. The increased speed of the soil-treating process and elimination of the unproductive manipulations with the wheels and other steps functionally connected with the operation of wheels make it possible to considerably increase the productivity of the attachment of the present invention as opposed to that of the prior-art attachments for the same purpose.

Figure 2:
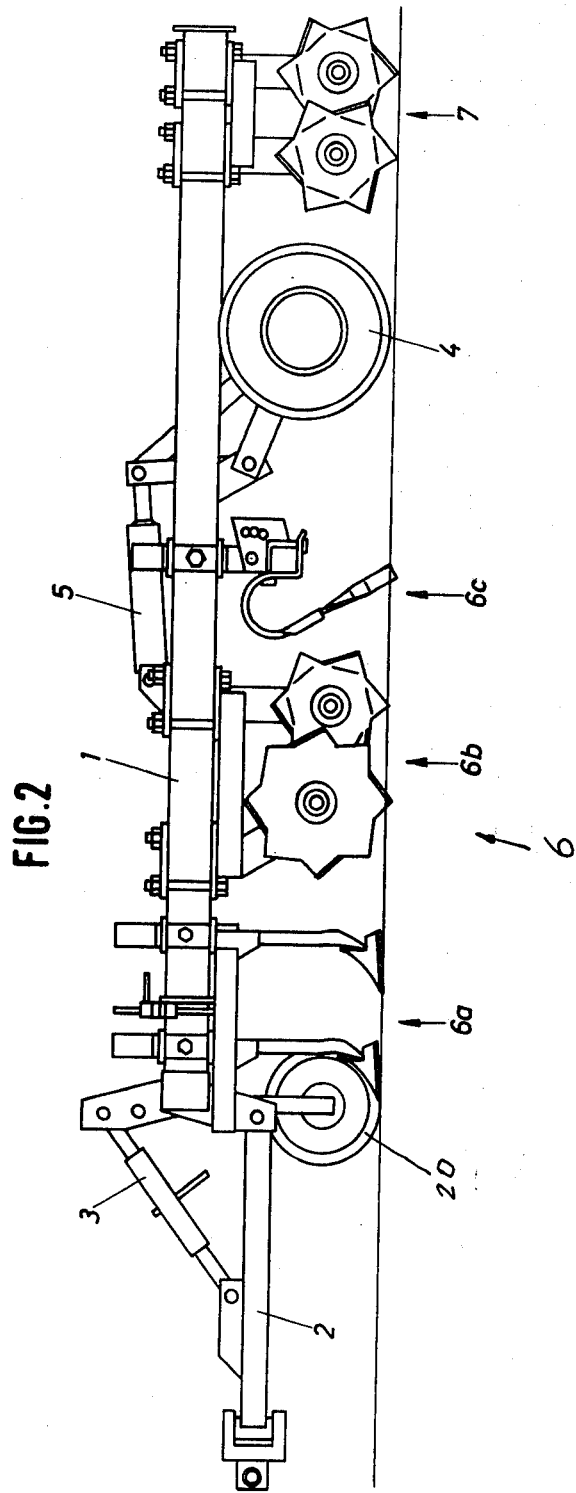
FIG. 2 is a side view of another embodiment of the attachment shown in FIG. 1.

In the embodiment shown in FIG. 2, the first soil-treating unit includes a set of grubbers 6a (i.e. similar to that shown in FIG. 1), a set of rollers 6b and a set of elastically yieldable tines 6c. The leading end portion of the frame 1 is provided with the additional supporting wheels 20 similar to those mentioned in the embodiment shown in FIG. 1. The remaining portion of the embodiment shown in FIG. 2 is similar to that of the embodiment discussed with reference to FIG. 1.

Figure 3:
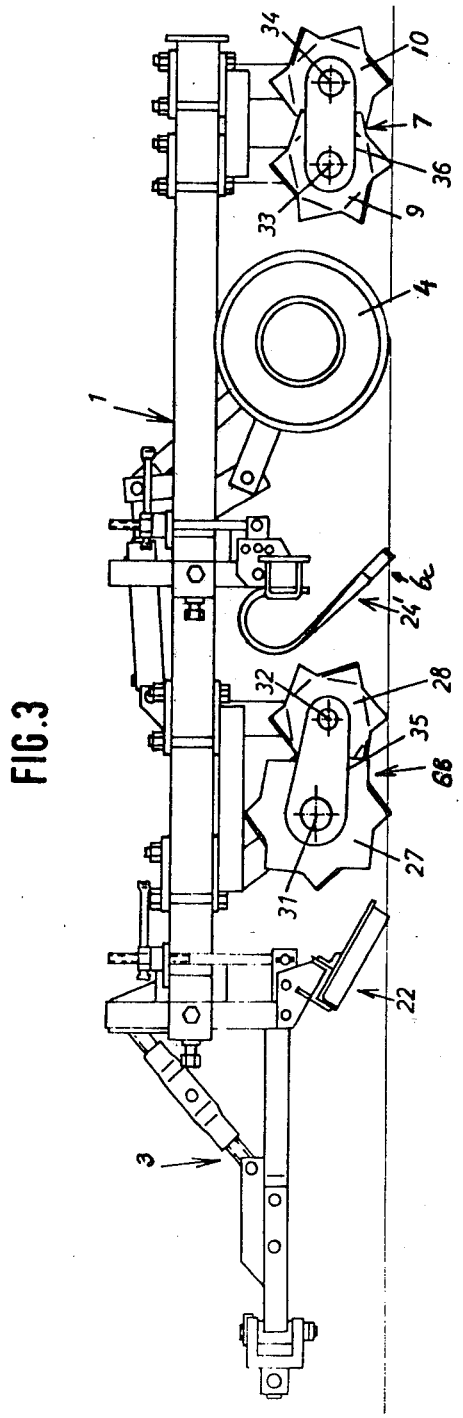
FIG. 3 is side view of still another embodiment of the attachment shown in FIG. 1.

In the embodiment shown in FIGS. 3 and 4, the frame 1 is provided with the first soil-treating arrangement 6 which includes a leveling unit 22 followed by the rollers unit 6b which is followed by the tines unit 6c. The second soil-treating arrangement 7 is substantially similar to that shown in FIGS. 1 and 2. The wheels 4 are located on the frame 1 between the tines unit 6c and the second soil-treating arrangement 7. The wheels 4 are adjustable (i.e. pivotable) relative to the frame 1 in the manner similar to that discussed with reference to FIG. 1.

The roller unit 6b includes two shafts 31 and 32 extending substantially transversely to the elongation of the frame 1 and parallel to each other. The shafts 31 and 32 are provided with cutting elements (e.g. disks or star rollers) 27 and 28, respectively. The cutting elements 27 and 28 of the respective shafts 31 and 32 are spaced along the elongation of the respective shafts so as to develop a space between each two adjacent cutting elements. The shafts 31 and 32 are so arranged relative to each other that each cutting element extends partially between the respective two adjacent cutting elements of the other shaft.

The shafts 31 and 32 are operatively connected to each other by means of an endless chain 35 so that both shafts 31 and 32 rotate together as long as the attachment (i.e. tractor) moves along the soil to be treated. In other words, during movement of the tractor the cutting elements 27 frictionally engage the soil to thereby rotate the shaft 31. Since the shaft 31 is operatively connected to the shaft 32, any rotation of the shaft 31 will lead to rotation of the shaft 32 and vice versa. Thus, any clogging (i.e. plugging) of the soil particles between the respective cutting elements of the shafts 31 and 32 is prevented.

The second soil-treating arrangement 7 includes two shafts 33 and 34 which extend substantially transversely to the elongation of the frame 1 and parallel to each other. The shafts 33 and 34 are provided with cutting elements (e.g. disks or star rollers) 9 and 10, similar to those described with reference to FIG. 1 and to those of the roller unit 6b of the first soil-treating arrangement 6. The shafts 33 and 34 are operatively connected to each other by means of an endless chain 36. The above description of the rollers unit 6b is entirely valid to the rollers unit of the second soil-treating unit 7.

The cutting elements 27 and 28 of the rollers unit 6b and the cutting elements 9 and 10 of the second soil-treating arrangement 7 may be of the same or different outer dimensions (e.g. diameter). However, according to the preferred embodiment of the present invention, the cutting elements 27 are of the outer dimension (e.g. diameter) exceeding that of the cutting elements 28. This is done since the cutting elements 27 encounter comparatively larger stresses during movement of the attachment along the field to be cultivated. The same respective arrangement may be made with reference to the cutting elements 9 and 10. Moreover, the outer dimension of the cutting elements 28 may exceed that of the cutting elements 9 and 10. However, in the preferred embodiment of the present invention the outer dimension of the cutting elements 28 is equal to that of the cutting elements 9 and 10.

The cutting elements 27 and 28 rotate on the respective shafts 31 and 32 with the same speed. However, it may be arranged that the cutting elements 27 and 28 will rotate with different speeds. The same consideration is true with reference to the cutting elements 9 and 10 of the second soil-treating arrangement 7.

The tines unit 6c includes a guide rail 24 for supporting a plurality of elastically yieldable tines 24'. Each tine 24' includes a lower free end which extends downwardly and rearwardly relative to the direction of movement of the attachment (i.e. tractor). The tines 24' are angularly adjustable relative to the guide rail 24.

The leveling unit 22 includes a guide rail 37 (see FIG. 5) extending substantially transversely to the elongation of the frame 1. The guide rail 37 is inclined rearwardly relative to the vertical position thereof. The leveling unit 22 further includes a leveling tool which is mounted on the guide rail 37 and extends at an angle relative to a vertical position thereof. The leveling tool may extend uninterruptedly along the entire elongation of the guide rail 37. However, in accordance with the preferred embodiment of the present invention, the leveling tool consists of a plurality of leveling sections 38–40 spaced from one another along the elongation of the guide rail 37. The leveling sections 38–40 may be of the same or of different configurations. Further, the leveling sections 38–40 may be inclined relative to the guide rail 37 or be parallel to the elongation thereof. The leveling guide sections 38–40 may be inclined relative to the guide rail at the same or at different angles (see FIG. 6). Thus, the leveling unit 22 functions similar to a conventional comb or rake substantially eliminating crests and troughs of furrows on the upper surface of the rail to be cultivated. Such an arrangement of the leveling unit renders it possible to substantially break all relatively large lumps of the soil.

It is possible to arrange all the leveling sections 38–40 so that they extend along the guide rail 37. However, in order to increase the efficiency of the leveling unit 22 it is possible to arrange some of the leveling sections extending substantially transversely to the elongation of the guide rail (see the leveling section 38 in FIG. 7) and some of the leveling sections extending parallel (along) the guide rail 37. The leveling sections 38–40 (or at least some of them) are so arranged on the guide rail 37 and relatively to the wheels of the tractor so as to eliminate the trace development caused by these wheels during the movement of the tractor along the field to be cultivated.

The guide rail 37 is provided with plate projections 41 extending from the upper surface of the guide rail 37 towards the frame 1. The plate projections 41 are connected to the frame 1 at both sides of the middle plane of the frame 1 through adjusting members 42 and connecting members 43, respectively. Such an arrangement makes it possible to vertically adjust the guide rail 37 relative to the frame 1 to thereby arrange an adequate extension of the guide rail 37 and, therefore, the leveling sections 38–40 relative to the inner surface of the frame 1.

The method of cultivating soil, in accordance with the present invention is schematically presented in FIGS. 8–12.

Figure 8:
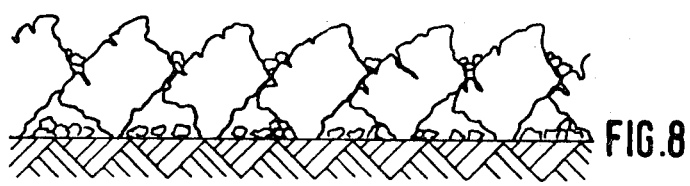
FIG. 8 is a schematical view of a section of the soil to be cultivated.

FIG. 8 shows the soil to be illustrated before the cultivation process according to the present invention starts; such a surface may be obtained after the soil has been plowed. It may be seen that the upper surface of the soil to be cultivated is very rough. In other words, the upper surface of the soil includes a plurality of crests and troughs.

Figure 9:
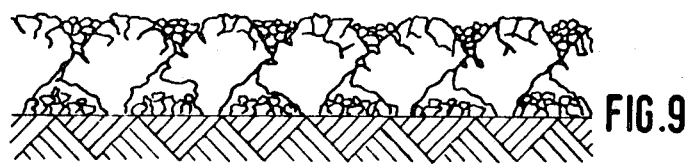
FIG. 9 is a schematical view of the section of the soil after the upper surface has been leveled.

When the tractor provided with the attachment shown in FIGS. 3–7 moves along the soil having the upper surface shown in FIG. 8, the leveling unit 22 substantially eliminates crests and troughs (see FIG. 9).

Figure 10:
FIG. 10 is a schematical view of the section of the soil after the same has been cut to obtain a stratum having particles of different sizes.
Figure 11:
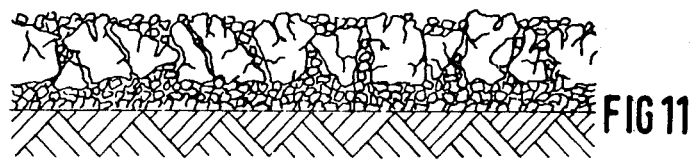
FIG. 11 is a schematical view of the section of the soil after the same has been correspondingly cultivated.

The following roller unit 6b cuts into the soil and comminutes the particles located on or close to the upper surface of the soil (see FIG. 10).

The following elastically yieldable tines of the unit 6c turn the stratum over (see FIG. 11) that is, the particles shown in FIG. 10 as located at the bottom of the stratum are brought all the way up onto and close to the upper surface of the stratum. However, the comminuted particles shown in FIG. 10 as located on or close to the upper surface of the stratum are brought all the way down towards the bottom of the stratum. Thus, the bottom portion of the stratum becomes slightly compacted (see FIG. 11).

The second soil-treating arrangement 7 (i.e. the rollers unit) comminutes the particles now located on or close to the upper surface of the soil. Thus, when the process of cultivation of the stratum is over, all of the particles of this stratum have substantially the same size (see FIG. 12).

Advantageously, an upper portion of the stratum is adequately cultivated and is ready for receiving seeds at a predetermined depth of the stratum, smaller than the depth of the stratum per se. A lower portion of the stratum is adequately compacted and constitutes a space for roots of the future crop.

Figure 12:
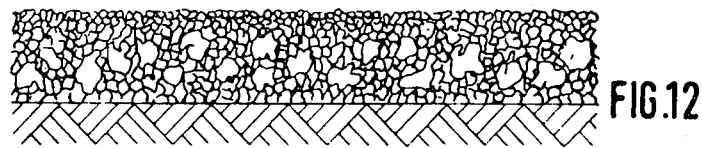
FIG. 12 is a schematical view of the section of the soil after the same has been finally cultivated so that the particles of the stratum have substantially the same size over the entire depth of the stratum.

As it may be seen in FIG. 12, the thusly cultivated stratum still consists of separate comparatively small particles which ensures an adequate aeration and humidification of the stratum over the entire depth thereof.

It will be understood that each of the elements described above, or two or more together, may also find a useful application in other types of arrangements for and a method of cultivating soil differing from the types described above.

While the invention has been illustrated and described as embodied in an arrangement for and methods of cultivating soil, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An attachment for agricultural machines, comprising a frame having a leading portion and a trailing portion; first soil-treating means mounted at said leading portion of said frame; second soil-treating means mounted at said trailing portion of said frame; wheel means mounted on said frame for supporting the latter when an agricultural machine provided with the attachment moves on a road, said wheel means being displaceable between a first position in which they engage the ground and support said frame thereon with said first and second soil-treating means being upwardly spaced from the ground, and a second position in which they do not engage the ground; means for coupling said frame at said leading portion thereof to a lifting drive so that, when said wheel means are in said second position, said trailing portion of the frame is supported on the ground by said second soil-treating means; a separate support mounted on said frame for supporting said first soil-treating means, said support having one end pivotably mounted on said frame and another end operatively connected to said frame so as to pivot said support relative to said frame and about said one end of said support; and means for adjustably connecting said other end of said support to said frame.

2. An attachment as defined in claim 1, wherein said wheel means are mounted on said frame between said first and second soil-treating means.

3. An attachment as defined in claim 1, wherein said wheel means are displaceable vertically.

4. An attachment as defined in claim 1, wherein said second soil-treating means are operative for comminuting soil particles located on and substantially close to an upper surface of the soil to be cultivated.

5. An attachment as defined in claim 4, wherein said second soil-treating means include a cutting unit including a plurality of cutting disks.

6. An attachment as defined in claim 5, wherein at least some of said cutting disks have a star-shaped cross-section.

7. An attachment as defined in claim 5, wherein said cutting unit includes at least two elongated shafts extending substantially transversely to the elongation of the frame and parallel to each other, and operative for receiving said cutting disks.

8. An attachment as defined in claim 7, wherein said cutting disks of each shaft are spaced from one another along the elongation of each shaft, said shafts being so arranged relative to each other that each cutting disk of one shaft extends partially between respective adjacent cutting disks of the other shaft.

9. An attachment as defined in claim 5, wherein said cutting disks are rotatable about an axis of rotation when the agricultural machine provided with the attachment moves along the soil to be cultivated, with said wheel means being in said second position.

10. An attachment as defined in claim 9, wherein said wheel means includes at least one wheel, when the latter is in said non-supporting position a lowest portion of said wheel being located at least above said axis of rotation of said cutting disks.

11. An attachment as defined in claim 1, and further comprising means for displacing said wheel means relative to the frame between said supporting and non-supporting positions, said displacing means being operative independently from said first and second soil-treating means.

12. An attachment as defined in clam 1, wherein said first soil-treating means include at least one grubber unit.

13. An attachment as defined in claim 1, wherein said first soil-treating means include at least one set of elastically yieldable tines.

14. An attachment as defined in claim 1, wherein said first soil-treating means include at least one cutting disks unit.

15. An attachment as defined in claim 14, wherein said cutting disks unit includes a plurality of cutting disks having a star-shaped cross-section.

16. An attachment as defined in claim 1, and further comprising additional wheel means located at the leading portion of said frame before said first soil-treating means.

17. An attachment as defined in claim 1, and further comprising third soil-treating means on said frame and including means for leveling an upper surface of the soil to be cultivated.

18. An attachment as defined in claim 17, wherein said leveling means are located on said frame at said leading end portion thereof and before said first and second soil-treating means.

19. An attachment as defined in claim 18, wherein said first and second soil-treating means include separate units for respectively cutting, turning over and comminuting the soil to be cultivated.

20. An attachment as defined in claim 17, wherein said first soil-treating means include a first cutting disk unit following said leveling means and a unit of elastically yieldable tines following said cutting disk unit, said second soil-treating means including a second cutting disk unit.

21. An attachment as defined in claim 20, wherein at least one of said first and second cutting disk units includes at least two cutting disk sets arranged one after another, said cutting disk sets being operatively connected to each other.

22. An attachment as defined in claim 21, wherein each of said cutting disk sets includes a rotatable shaft and a plurality of cutting disks fixedly mounted on said shaft for rotation therewith.

23. An attachment as defined in claim 22, and further comprising means for operatively connecting said shafts of said cutting disk sets, so that rotation of one of said shafts immediately causes rotation of the other of said shafts.

24. An attachment as defined in claim 23, wherein said operatively connecting means include an endless chain connecting said shafts to each other.

25. An attachment as defined in claim 17, wherein said leveling means include a guide rail extending substantially transversely to the elongation of said frame and connected thereto.

26. An attachment as defined in claim 25, wherein said leveling means further include a plurality of leveling tools mounted on said guide rail along the elongation thereof, and extending from said guide rail downwardly towards the ground.

27. An attachment as defined in claim 26, wherein said guide rail is angularly adjustable relative to said frame.

28. An attachment as defined in claim 26, wherein said guide rail is vertically adjustable relative to said frame.

29. An attachment as defined in claim 26, wherein said leveling tools extend on said guide rail rearwardly relative to the movement of the agricultural machine provided with the attachment during cultivation of the soil.

30. An attachment as defined in claim 26, wherein at least some of said leveling tools are so arranged on the guide rail as to eliminate trace development caused by wheels of the agricultural machine when the latter moves along the soil to be cultivated.

31. An attachment as defined in claim 1, wherein said first soil-treating means mounted at said leading portion includes at least one soil-cutting unit, said second soil-treating means mounted at said trailing portion of said frame including at least one soil-treating disk unit.

32. An attachment as defined in claim 31, wherein said cutting unit includes at least one grubber unit and said soil-treating disk unit includes at least one cutting disk unit.

33. An attachment as defined in claim 32, wherein said first soil-treating means also includes at least one cutting disk unit.

34. An attachment as defined in claim 31, further comprising leveling means mounted at said leading portion of said frame.

35. An attachment as defined in claim 34, wherein said leveling means are mounted ahead of said first soil-treating means.

36. A method of cultivating soil by an attachment for agricultural machines, which comprises a frame having a leading portion with first soil-treating means and a trailing portion with second soil-treating means, wheel means mounted on the frame and displaceable in the vertical direction and coupling means for coupling the leading portion of the frame to an agricultural machine, the method comprising the steps of displacing the wheel means to a supporting position in which they engage the ground and the first and second soil-treating means are upwardly spaced from the ground so that the attachment can move on a road; displacing the wheel means to a non-supporting position in which they do not engage the ground and the first and second soil-treating means engage the ground so that the first and second soil-treating means can treat the soil; and lifting the leading portion of the frame relative to the coupling means so that said first soil-treating means is lifted from the ground, whereas the trailing portion of the frame is supported on the ground by said second soil-treating means, whereby the attachment can make turns on a field without displacing the wheel means to the supporting position.

37. A method of cultivating soil by an attachment for agricultural machines, which comprises a frame having a leading portion with first soil-treating means, and a trailing portion with second soil-treating means, and coupling means for coupling the leading portion of the frame to an agricultural machine, the method comprising the steps of displacing the first and second soil-treating means so that they are upwardly spaced from the ground and thereby the attachment can move on a road; displacing the first and second soil-treating means so that they engage the ground and thereby treat the soil; and lifting the leading portion of the frame relative to the coupling means so that only said first soil-treating means is lifted from the ground, whereas the trailing portion of the frame is supported on the ground by said second soil-treating means, whereby the attachment can make turns on a field without being supported by means other than said second soil-treating means.

38. A method as defined in claim 37, wherein said second-mentioned displacing step includes leveling the upper surface of the soil so as to substantially reduce the roughness of the upper surface thereof, cutting the soil to obtain a stratum of a predetermined depth, having particles of substantially different sizes, and comminuting the thusly obtained particles until the latter have substantially the same size over the entire depth of the stratum.

39. A method as defined in claim 38, wherein said leveling step is carried out before said cutting step.

40. A method as defined in claim 38, wherein said comminuting step includes a first step of comminuting the particles located on and substantially close to the upper surface of the soil to be cultivated.

41. A method as defined in claim 40, and further comprising the step of turning over the soil in said stratum so that the particles located substantially at the bottom of the stratum are brought on and substantially close to the upper surface of the soil to be cultivated.

42. A method as defined in claim 41, wherein said comminuting step includes a second step of comminuting the particles located on and substantially close to the upper surface of the soil.

43. A method as defined in claim 42, wherein said second comminuting step is carried out after said first comminuting step.

44. A method as defined in claim 43, wherein said turning over step is carried out between said first and second comminuting steps.

45. An attachment for agricultural machines, comprising a frame having a leading portion and a trailing portion; first soil-treating means mounted at said leading portion of said frame; second soil-treating means mounted at said trailing portion of said frame; third soil-treating means on said frame and including means for leveling an upper surface of the soil to be cultivated, said leveling means including a guide rail extending substantially transversely to the elongation of said frame and connected thereto, and a plurality of leveling tools mounted on said guide rail along the elongation thereof and extending from said guide rail downwardly towards the ground, at least some of said leveling tools being so arranged on the guide rail as to eliminate trace development caused by wheels of the agricultural machine when the latter moves along the soil to be cultivated, said some levelling tools being inclined at different angles relative to the vertical position thereof in the plane of the elongation of said guide rail; wheel means mounted on said frame for supporting the latter when an agricultural machine provided with the attachment moves on a road, said wheel means being displaceable between a first position in which they engage the ground and support said frame thereon with said first and second soil-treating means being upwardly spaced from the ground, and a second position in which they do not engage the ground; and means for coupling said frame at said leading portion thereof to a lifting drive so that, when said wheel means are in said second position, said trailing portion of the frame is supported on the ground by said second soil-treating means.

* * * * *